United States Patent
Dalal et al.

(10) Patent No.: US 7,928,169 B2
(45) Date of Patent: Apr. 19, 2011

(54) CPVC COMPOSITIONS HAVING GOOD IMPACT STRENGTH AND HEAT STABILITY, AND SMOOTH SURFACES

(75) Inventors: Girish T. Dalal, Avon Lake, OH (US); Ann Giovannitti-Jensen, Bay Village, OH (US); Theodore J. Schmitz, Avon, OH (US); David A. Wendell, Avon, OH (US); Mark D. Julius, Avon, OH (US); Robert S. Newby, Hudson, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 12/102,354

(22) Filed: Apr. 14, 2008

(65) Prior Publication Data

US 2008/0188608 A1 Aug. 7, 2008

Related U.S. Application Data

(62) Division of application No. 10/722,623, filed on Nov. 26, 2003.

(51) Int. Cl.
*C08F 283/12* (2006.01)
(52) U.S. Cl. ........ 525/479; 524/401; 524/409; 524/450; 524/567; 428/36.9
(58) Field of Classification Search .................. 428/36.9; 525/479; 524/401, 409, 450, 567
See application file for complete search history.

(56) References Cited

U.S. PATENT DOCUMENTS

| | | |
|---|---|---|
| 2,996,049 A | 8/1961 | Huska |
| 3,100,762 A | 8/1963 | Shockney |
| 3,506,637 A | 4/1970 | Makino |
| 3,532,612 A | 10/1970 | Weben et al. |
| 3,534,013 A | 10/1970 | Wakabayashi et al. |
| 3,591,571 A | 7/1971 | Steinbach-Van Gaver |
| 4,049,517 A | 9/1977 | Adachi et al. |
| 4,123,376 A | 10/1978 | Gray |
| 4,350,798 A | 9/1982 | Parker |
| 4,377,459 A | 3/1983 | Parker |
| 4,412,898 A | 11/1983 | Olson et al. |
| 5,194,471 A | 3/1993 | Hartitz |
| 5,216,088 A | 6/1993 | Cinadr et al. |
| 5,340,880 A | 8/1994 | Backman et al. |
| 5,635,588 A | 6/1997 | Eshuis et al. |
| 5,821,304 A | 10/1998 | Backman et al. |
| 5,912,277 A | 6/1999 | Detterman |
| 5,981,663 A | 11/1999 | Backman et al. |
| 6,096,820 A | 8/2000 | Lockledge et al. |
| 6,306,945 B1 | 10/2001 | Lepilleur et al. |
| 6,486,333 B1 | 11/2002 | Murayama et al. |
| 2003/0018112 A1 | 1/2003 | Okuhara et al. |

FOREIGN PATENT DOCUMENTS

| | | |
|---|---|---|
| EP | 0 695 782 A1 | 2/1996 |
| WO | 98/53005 A1 | 11/1998 |

*Primary Examiner* — Kuo-Liang Peng
(74) *Attorney, Agent, or Firm* — Samuel B. Laferty

(57) ABSTRACT

A CPVC composition having good impact and heat stability includes a siloxane-acrylic copolymer impact modifier and an aluminosilicate zeolite, and a reduced amount of a liquid stabilizer such as a tin compound. Such compositions can be formed into piping for indoor and outdoor water systems including hot water.

13 Claims, No Drawings

CPVC COMPOSITIONS HAVING GOOD IMPACT STRENGTH AND HEAT STABILITY, AND SMOOTH SURFACES

FIELD OF INVENTION

The present invention relates to chlorinated polyvinyl chloride (CPVC) compositions which are formed into products, as by extruding, having smooth surfaces and improved properties such as heat stability and impact strength. The compositions contain CPVC, a siloxane-acrylic copolymer impact modifier, an aluminosilicate zeolite, and small amounts of metal stabilizers.

BACKGROUND OF THE INVENTION

Heretofore, CPVC compositions generally did not exist having improved impact resistance and heat stability properties along with smooth surfaces in a melt processed product.

U.S. Pat. No. 6,306,945 relates to a halogen containing polymer compound containing a modified zeolite stabilizer. The modified zeolite stabilizer has a small particle diameter, narrow particle size distribution and less than 10 weight percent water. The modified zeolite stabilizer is formed by shock annealing, coating or a combination of the two methods.

U.S. Pat. No. 5,194,471 relates to CPVC compositions, pipe, and a method of preparing a pipe comprising a CPVC having 63% to 70% by weight chlorine and preferably 65% to about 69% chlorine; a high rubber impact modifier comprising a graft copolymer of a rubbery polydiene and one or preferably more than one hardening monomer selected from a group consisting of a vinyl aromatic monomer, a (meth) acrylate, and a (meth)acrylonitrile monomer including mixtures.

Said graft copolymer exhibits a Shore D hardness of less than about 64, and preferably between about 35 and 45; and a chlorinated polyethylene containing between 30% and 40% chlorine by weight.

European Patent Application 695782 relates to thermoplastic polymer compounds comprising a blend of a chlorinated polyvinyl chloride and an impact modifier containing a polyorganosiloxane. The novel thermoplastic compound has improved stability and toughness and exhibits a low rate of heat release.

SUMMARY OF THE INVENTION

The compositions of the present invention comprise CPVC containing high amounts of chlorine such as from about 60% to about 75% by weight of the polymer. The CPVC is melt blended with various compounds including an impact modifier, a low amount of a metal stabilizer, and a zeolite co-stabilizer. The impact modifier imparts very high impact strength, even at low temperatures, and excellent weatherability to the composition product. The impact modifier is generally a copolymer of various acrylates and a silicone-containing compound such as a polysiloxane. The metal stabilizers are usually liquid with tin containing stabilizer being preferred. Low amounts of the stabilizer in the composition have been found to yield shorter fusion times which results in improved surface smoothness of the product.

The zeolite co-stabilizer utilized in combination with the silicone-acrylic impact modifier has been found to yield synergistic results with regard to at least improved heat stability (for example good heat aging resistance).

DETAILED DESCRIPTION

PVC

The polyvinyl chloride (PVC) precursor which is utilized in the present invention desirably has an inherent viscosity from about 0.80 to about 1.2 and desirably from about 0.85 to about 1.0 according to ASTM-D 1243. The inherent viscosity, as noted, is with respect to the precursor PVC polymer or copolymer, etc., which is utilized to form the CPVC polymer utilized in the present invention. The PVC resin can be formed by mass, suspension or emulsion polymerization techniques. Examples of suitable PVC homopolymers which can be used to form the chlorine containing compounds of the instant invention include Geon 103EPF76TR, 103 EPF76, 110X440, 1023PF5, G-27, and G-30; all available from The PolyOne Company.

CPVC

CPVC is obtained by chlorinating one or more homopolymers of PVC, or one or more copolymers of PVC containing less than fifty percent (50%) by weight of one or more copolymerizable comonomers. Preferably, comonomers are not used. However, suitable comonomers include acrylic and methacrylic acids; esters of acrylic and methacrylic acid wherein the ester portion has from 1 to 12 carbons; hydroxyalkyl esters of acrylic and methacrylic acid (for example hydroxymethyl methacrylate, hydroxyethyl acrylate, hydroxyethyl methacrylate and the like); glycidyl ester of acrylic and methacrylic acid (for example glycidyl acrylate, glycidyl methacrylate and the like); alpha,beta-unsaturated dicarboxylic acids and their anhydrides (for example maleic acid, fumaric acid, itaconic acid and the like); acrylamide and methacrylamide; acrylonitrile and methacrylonitrile; maleimides; olefins (for example ethylene, propylene, isobutylene, hexene and the like); vinylidene halide; vinyl esters; vinyl ethers; crosslinking monomers (for example, diallyl phthalate, ethylene glycol dimethacrylate, methylene bisacrylamide, divinyl ether, allyl silanes and the like).

Any post chlorination processes can be used to form CPVC polymer having more than fifty-seven percent (57%) by weight chlorine based upon the total weight of the polymer. Preferably, the CPVC polymer has a chlorine content in the range of about 60% to about 75% by weight and preferably from about 65% to about 70% by weight based upon the total weight of the polymer. The post chlorination processes which can be used include any commercial process or the like such as solution process, fluidized bed process, water slurry process, thermal process or liquid chlorine process or two step process which comprises post chlorinating the vinyl chloride polymer in the presence of a peroxy catalyst during both steps. In as much as the post chlorination processes are known to the art as well as the literature, they will not be discussed in detail here. Rather reference is hereby made to U.S. Pat. Nos. 2,996,049; 3,100,762; 4,412,898 3,532,612; 3,506,637; 3,534,013; 3,591,571; 4,049,517; 4,350,798; 4,377,459, 5,216,088, 5,340,880, 5,821,304; 5,981,663; and 6,187,868 which are hereby fully incorporated by reference as to the method of forming CPVC by post chlorinating PVC. The preferred process in forming the CPVC from the PVC is the aqueous suspension process disclosed in U.S. Pat. No. 4,412,898.

In addition, blends of various CPVC resins can also be used. For example, the CPVC resin can be blended with PVC homopolymers or copolymers or with another CPVC resin in an amount of other resin of from about 1 weight percent to about 50 weight percent. Additionally, the CPVC can also be blended from about 1 weight percent to about 50 weight percent with another halogen containing polymer or polymers.

The CPVC used in the invention desirably will have a density from about 1.38 to about 1.65 and desirably from about 1.50 to about 1.60 grams/cubic centimeter at 25° C., (ASTM-D1895-69). Examples of suitable CPVC resins which can be used to form the compound of the instant invention include TempRite® 677X670 CPVC, and TempRite® 674X571 CPVC, all available from Noveon Inc. TempRite® is a registered trademark of Noveon Inc. The most preferred CPVC resin is TempRite® 674X571 CPVC resin.

Impact Modifier

The impact modifier of the present invention generally relates to copolymers derived from organosiloxane monomers and various acrylic monomers. Optionally but desirably, a crosslinking agent as well as an optional grafting agent can be utilized. While various copolymers can be utilized, a core-shell copolymer type impact modifier is generally preferred. The total amount of the polyorganosiloxane is generally from about 10% to about 90% by weight based upon the total weight of the polyorganosiloxane and the one or more acrylics.

The one or more organosiloxanes which can be utilized include cyclic siloxanes such as 3- to 6-membered cyclosiloxanes with examples including hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane and octaphenylcyclotetrasiloxane.

These organosiloxanes may be used alone or in combination as a mixture of two or more different types. The organosiloxane is used in an amount of at least 50% by weight, preferably at least 70% by weight of the polyorganosiloxane. However, preferred impact modifiers are also made from the various alkyl and more specifically the various dialkyl siloxanes wherein the alkyl group, independently, contains from 1 to about 5 carbon atoms with methyl being especially preferred. Thus a highly preferred monomer is dimethyl siloxane.

The crosslinking agent for the organosiloxane may be a trifunctional or tetrafunctional silane type crosslinking agent such as trimethoxymethylsilane, triethoxyphenylsilane, tetramethoxysilane, tetraethoxysilane, tetra-n-propoxysilane or tetrabutoxysilane. Tetrafunctional crosslinking agents are particularly preferred, and among them tetraethoxysilane is especially preferred. The crosslinking agent is used usually in an amount of from 0.1 to about 30% by weight of the polyorganosiloxane.

The optional grafting agent for the organosiloxane may be a compound capable of forming a unit represented by the formula:

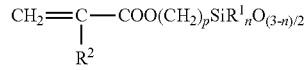  (I-1)

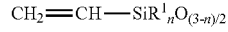  (I-2)

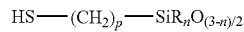  (I-3)

wherein $R^1$ is a methyl group, an ethyl group, a propyl group or a phenyl group, $R^2$ is a hydrogen atom or a methyl group, n is 0, 1 or 2, and p is a number 0 from 1 to 6.

The polyorganosiloxane can be prepared by any method in which the organosiloxane, the optional crosslinking agent and the optional grafting agent are mixed. The preparation is well within the scope of one of ordinary skill in the art, and does not form part of this invention.

The polyorganosiloxane can be compounded with (meth) acryloyloxysiloxane capable of forming the unit of the formula (I-1). A methacryloyloxysilane is particularly preferred as the compound capable of forming the unit of the formula (I-1). Specific examples of the methacryloyloxysilane include
β-methacryloyloxyethyldimethoxymethylsilane,
τ-methacryloyloxypropylmethoxydimethylsilane,
τ-methacryloyloxypropyldimethoxymethylsilane,
τ-methacryloyloxypropyltrimethoxysilane,
τ-methacryloyloxypropylethoxydiethylsilane,
τ-methacryloyloxypropyldiethoxymethylsilane and
δ-methacryloyloxybutyldiethoxymethylsilane. The grafting agent when utilized is from 0.1% to about 10% by weight of the polyorganosiloxane.

The various acrylic monomers are desirably one or more alkyl methacrylates or an alkylacrylate wherein the alkyl portion contains from 1 to about 10 carbon atoms. Examples of such acrylic monomers include methyl acrylate, ethyl acrylate, n-propyl acrylate, n-butyl acrylate or 2-ethylhexyl acrylate, or an alkyl methacrylate such as methyl methacrylate, ethyl methacrylate, butyl methacrylate, hexyl methacrylate, 2-ethylhexyl methacrylate or n-lauryl methacrylate. It is particularly preferred to use butyl acrylate. The crosslinking agent for the alkyl (meth)acrylate can be, for example, ethylene glycol dimethacrylate, propylene glycol dimethacrylate, 1,3-butylene glycol dimethacrylate or 1,4-butylene glycol dimethacrylate. The grafting agent for the alkyl (meth)acrylate can be, for example, allyl methacrylate, triallyl cyanurate or triallyl isocyanurate. Allyl methacrylate can be used alone as a crosslinking agent. The preparation of the polyalkyl (meth)acrylate is well within the scope of one of ordinary skill in the art and does not form part of this invention.

The two components, the polyorganosiloxane and the polyalkyl acrylate, and/or the polyalkyl methacrylate can be polymerized together to form the impact modifier in a manner such as for example described by European Patent EP 0308871 A2, fully incorporated herein by reference. Any other method can be used to combine the two components, including those known within the art. For example, a core shell polymer can be made utilizing the polyorganosiloxane and polyalkyl acrylate as the core with the shell being a polyalkyl methacrylate optionally grafted to the core. The polymerization of the two components is well within the scope of one of ordinary skill in the art and does not form part of this invention.

The preferred impact modifier contains dimethyl siloxane. Most preferably, the impact modifier comprises a butyl acrylate-methyl methacrylatepoly(dimethyl siloxane) copolymer. An example of a commercially available polyorganosiloxane impact modifier is Metablen S-2001 manufactured by the Mitsubishi Rayon Co. and available from Metco North America.

The amount of the siloxane-acrylic copolymer impact modifier of the present invention is generally from about 3 to about 12 parts by weight and desirably from about 4 to about 10 parts by weight per 100 parts by weight of the CPVC. Not only does the impact modifier impart improved impact properties to the CPVC composition, but it also acts as a plasticizer and further imparts excellent weatherability to the composition.

Zeolite Co-Stabilizer

A zeolite co-stabilizer is utilized to impart good UV resistance as well as good heat stability such as aging resistance to the CPVC composition. The one or more zeolites are generally an alumina-silicone containing composition which contains low amounts of water therein, for example from about 1% to about 30% and preferably from about 10% to about 20% by weight of the zeolite compound. The zeolites of the present invention have a narrow particle size distribution and a small particle size. Preferably the zeolite should have a mean particle diameter in the range of about 0.25 to about 1.5 microns, and a <90% value particle diameter (90% by weight of the particles are of a particle diameter below the range) of about 0.30 to about 3 microns.

Zeolites comprise basically of a three dimensional framework of $SiO_4$ and $AlO_4$ tetrahedra. The tetrahedra are crosslinked through the sharing of oxygen atoms so that the ratio of oxygen atoms to the total of the aluminum and silicon atoms is equal to 2. This relationship is expressed as $O/(Al+Si)=2$. The electrovalence of the tetrahedra containing aluminum and silicon is balanced in the crystal by the inclusion of a cation. The cation can be an alkali or alkaline earth metal ion. The cation can be exchanged for another depending upon the final usage of the aluminosilicate zeolite. The spaces between the tetrahedra of the aluminosilicate zeolite are usually occupied by water. Zeolites can be either natural or synthetic.

The basic formula for all aluminosilicate zeolites is represented as follows:

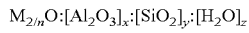

$$M_{2/n}O:[Al_2O_3]_x:[SiO_2]_y:[H_2O]_z$$

wherein M represents a metal, n represents the valence of the metal and X and Y and Z vary for each particular aluminosilicate zeolite as from 1 to about 50 and desirably from about 5 to about 30. Essentially it is believed that any aluminosilicate zeolite can be used as a stabilizer in the instant invention, provided that the ratio of the silicon to aluminum in such aluminosilicate zeolite is less than 3.0 and that the aluminosilicate zeolite can be incorporated into the halogen containing polymer. Preferably, the zeolite ratio of silicon to aluminum in such aluminosilicate zeolite is less than 1.5. Most preferably, the ratio of silicon to aluminum in such aluminosilicate zeolite is about 1.

It is further believed that the following zeolites which can be used in the instant invention include but are not limited to zeolite A, described in U.S. Pat. No. 2,822,243; zeolite X, described in U.S. Pat. No. 2,822,244; zeolite Y, described in U.S. Pat. No. 3,130,007; zeolite L, described in Belgian Pat. No. 575,117 zeolite F, described in U.S. Pat. No. 2,996,358; zeolite B, described in U.S. Pat. No. 3,008,803; zeolite M, described in U.S. Pat. No. 2,995,423; zeolite H, described in U.S. Pat. No. 3,010,789; zeolite J, described in U.S. Pat. No. 3,011,869; and zeolite W, described in U.S. Pat. No. 3,102,853.

The preferred zeolites include alone or in combination with another Group I metal, hydrated silicates of aluminum incorporating sodium, of the type $mNa_2O \cdot xAl_2O_3 \cdot ySiO \cdot zH_2O$. These preferred zeolites include zeolites A, X, and Y. The most preferred zeolite is zeolite 4A. Zeolite 4A, preferably has the following formula:

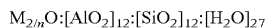

$$M_{2/n}O:[AlO_2]_{12}:[SiO_2]_{12}:[H_2O]_{27}$$

wherein M is sodium. Any method can be used to form such zeolite provided that the mean particle diameter of the zeolite is less than 1.5 microns, and <90% value particle diameter of about 0.30 to about 3 microns.

For example, a relatively simple process can be used to prepare the zeolite of the instant invention. First, the zeolite is synthesized. The exact synthesis will vary dependent upon the specific zeolite being used; this synthesis is well within the skill of one of ordinary skill in the art. Generally, however, a mixture of the aqueous solution of the materials which can be represented as mixtures of oxides, $Na_2O$; $Al_2O_3$; $SiO_2$ and $H_2O$ are reacted at a temperature in the range of about 50° C. to about 100° C. for a period of about 45 minutes to about 2000 minutes. Alternatively, the mixture of the reactants are allowed to age from about 0.1 to 48 hours at ambient conditions prior to the crystallization step. Preferably, the temperature of the reaction is in the range of about 50° C. to about 80° C. and the reaction is carried out for about 60 to 420 minutes. Most preferably, the temperature is 60° C. to 70° C. with a reaction of time of 90 to 300 minutes. The result of this reaction is a zeolite having a mean particle diameter in the range of about 0.25 to 1.5 microns. The <90 percent particle diameter value is in the range of about 0.30 to about 3.0 microns.

After the zeolite is formed, it is washed. The zeolite can be washed with deionized water, filtered and dried at about 100° C. to about 200° C., then dehydrated at about 250° C. to about 500° C. Any means available to dehydrate the zeolite can be used. It is believed that the zeolite has better reproductivity if dried. For example, the zeolite can be furnace dehydrated. If furnace dehydrated, any suitable furnace can be used provided that the desired temperature can be reached. Generally if furnace dehydrated, the zeolite is heated to approximately 250° C. to about 500° C. for about 2 to 6 hours. Alternatively, the small particle size zeolite can be dehydrated in vacuo at approximately 200° C. for about 2 to about 6 hours.

Modified Zeolites Having Low Water Content

The aluminosilicate zeolite of the present invention can be modified to contain a water content of less than 10 weight percent if desired. Generally such a low water content is not needed.

Any method which decreases the water content of the aluminosilicate zeolite can be used. For example, the aluminosilicate zeolite can be modified by chemically altering the surface of the zeolite particles, shock annealing or by a coating or by a combination of shock annealing and coating processes. The purpose of the modification is to prevent the aluminosilicate zeolite particles from absorbing water but still allowing the zeolite particles to react with the acid released upon the deterioration or degradation of the halogen containing polymer. If CPVC is the polymer used in the halogen containing compound, preferably, the water content of the modified aluminosilicate zeolite is less than 8 weight percent.

Any organic, inorganic or low number average molecular weight (<10,000) coating or coating mixture can be used provided that it has the following characteristics. First, in the case of inorganic coatings, they cannot be redox active; namely, the composition should have its d shell filled. Second, the coating cannot be water soluble or water permeable. Third, the coating should be reactive or permeable to the halogen acid. Fourth, the coating should not be a Lewis Acid. Preferably the coating used is miscible with the halogen containing polymer. Examples of suitable coatings include oxides such as magnesium oxide, paraffin waxes, low molecular weight organic matrices such as calcium stearate, high molecular weight matrices such as siloxanes, acrylic polymers such as methacrylate polymers. Preferably the coating is either dibutyl tin thioglyocalate or polydimethysiloxane.

The coating can be prepared in situ during the formation of the zeolite particles or applied to the zeolite particles in a separate step. If applied in a separate step, care should be taken to ensure the uniform application of the coating as well as to avoid clumping. Furthermore, the coating cannot be too thick or too thin, therefore, a balance must be obtained so as to ensure low water absorption but retain activity of the zeolite particles as acid scavenger.

Alternatively, the zeolite particles can be modified by shock annealing the particles. With the use of a shock annealing process for the zeolite particles, a phase transformation occurs at the outer surface of the zeolite particle shell. It is believed that the phase transformation causes the collapse of the zeolite structure at the outer surface. The shock annealing occurs at a temperature above the phase transformation temperature of the zeolites followed by rapid cooling. The shock annealing is carried out for the appropriate time to cause the outer surface of the particles to collapse. Exposure time to this temperature above the phase transformation temperature is however limited to minimize the bulk absorption of thermal energy and to limit the phase transformation to the outer surface of the particles. The temperature at which the zeolite is heated during the shock annealing process is dependent upon the particular zeolite being shock annealed. The temperature as well as the time to shock anneal is well within the skill of one of ordinary skill in the art.

The zeolite particles are placed in a furnace during the shock annealing step. Preferably, the particles are placed in a preheated crucible which can be made from quartz, high temperature steels or aluminum oxide. The crucible with the particles are returned to a muffle furnace. Any furnace can be used so long as it reaches the desired temperature. In the most preferred embodiment, an aluminum oxide crucible is preheated to approximately 700° C. to 1200° C. prior to the addition of the small particle size zeolite.

Once the zeolite is added, it is heated about 1 to about 30 minutes in the temperature range of about 700° C. to about 1200° C. After the zeolite particles are heated, they are cooled. Any cooling means can be used so long as the temperature is cooled below the phase transformation temperature in a matter of seconds, for example, about 600° C. for zeolite 4A. Therefore, the particles can be cooled by air, water, carbon dioxide or liquid nitrogen.

Alternatively, the zeolite particles can be modified by both shock annealing and coating. If such a combination method is used to modify the zeolite particles, they are first shock annealed to within 15 to 10 percent of the desired optimum properties and then coated. By using both a coating and the shock annealing step, it may be possible to use other coatings which do not meet all the listed parameters set forth above with respect to the coatings.

Whether or not the zeolite is modified to have a low water content, the amount thereof is generally from about 0.20 to about 2.5 parts by weight, and desirably from about 0.40 to about 1.50 parts by weight per 100 parts by weight of said CPVC. In addition to the above noted improved properties of heat stability, UV resistance, the dynamic thermal stability of the CPVC composition as measured by ASTM D-2538 is increased.

The utilization of the siloxane-acrylic copolymer impact modifier with the aluminosilicone co-stabilizer results in a synergistic improvement with regard to high heat stability and also permits the use of a lower amount of liquid metal stabilizer which results in shorter fusion time and improves the surface smoothness of a product made from the CPVC composition.

Metal Stabilizers

The metal containing stabilizers which can be utilized in the present invention include tin containing stabilizers, as well as stabilizers containing lithium, sodium, potassium, magnesium, calcium, strontium, barium, zinc, cadmium, aluminum, and antimony. Many of these enumerated stabilizers fall into a group of stabilizers called metal soap stabilizers. Metal soap stabilizers are metal carboxylates wherein the carboxylic acid typically has a chain length of 8 to 18 carbon atoms.

Metal soap stabilizers can also include mixed metal soaps stabilizers. Examples of some mixed metal soap stabilizers include barium/cadmium, barium/cadmium/zinc, barium/zinc, barium/tin, barium/lead, cadmium/zinc, calcium/zinc, calcium/zinc/tin, strontium/zinc.

Suitable tin stabilizers include tin salts of monocarboxylic acids such as stannous maleate. Examples of tin stabilizers include without limitation: alkylstannoic acids, bis(dialkyltin alkyl carboxylate)maleates, dialkyltin bis(alkylmaleates), dialkyltin dicrotonates, dialkyltin diolates, dialkyltin laurates, dialkyltin oxides, dialkyltin stearates, alkylchlorotin bis(alkylmercaptides), alkylchlorotin bis(alkylmercaptopropionates), alkylthiostannoic acids, alkyltin tris(alkylmercaptides), alkyltin tris(alkylmercaptoacetates), alkyltin tris(alkylmercaptopropionates), bis[dialkyl (alkoxycarbonylmethylenethio)tin]sulfides, butyltin oxide sulfides, dialkyltin bis(alkylmercaptides), dialklyltin bis (alkylmercaptoacetates), dialkyltin bis(alkylmercaptopropionates), dialkyltin β-mercaptoacetates, dialkyltin β-mercaptoacetates, dialkyltin β-mercaptopropionates, and dialkyltin sulfides. Examples of specific tin stabilizers include dibutyltin bis(i-octyl maleate), dibutyltin bis(i-octyl thioglycolate), dialkyltin bis(thioglycolate) wherein said alkyl group has from 1 to 10 carbon atoms such as dibutyl or dioctyl bis (thioglycolate), dibutyltin bisthiododecane, dibutyltin β-mercaptopropionate, dimethyltin bis(i-octyl thioglycolate), dioctyltin laurate, methyltin tris(i-octyl thioglycolate), dibutyltin dilaurate, dibutyltin maleate, di(n-octyl) tin maleate, dibutyl tin bis(2-ethylhexyl mercaptoacetate), dibutyltin bis(lauryl mercaptide), dibutyltin, S,S-bis(isooctylthioglycoate), di-n-octyltin S,S-bis(isooctylthioglycolate), and din-octyltin β-mercaptoproprionate. Dibutyltin and dioctyltin bis (thioglycolate) are preferred. Commercial examples of such preferred tin stabilizers include Mark 292 and Mark 1900 from Witco Chemical Company and Thermolite 31 from Elf Atochem.

The amount of the metal containing stabilizer is generally low such as about 0.5 to about 4.0, and preferably from about 1.0 to about 2.0 parts by weight per 100 parts by weight of said CPVC.

Processing Aids

Another additive of the CPVC composition of the present invention are various processing aids which serve to improve polymer melt processing. A desired processing aid is chlorinated polyethylene (CPE) which is a rubbery material resulting from the chlorination of polyethylene having a substantially linear structure. The polyethylene can be chlorinated by various methods including aqueous suspension, solution or gas phase methods. An example of a method for preparing CPE can be found in U.S. Pat. No. 3,563,974. Preferably, the aqueous suspension method is used to form the CPE. If used as an impact modifier, the CPE material contains from 5% to 50% by weight of chlorine. Preferably, the CPE contains from 25% to 45% by weight of chlorine. However, the CPE can comprise a mixture of chlorinated polyethylenes, provided that the overall mixture has a chlorine content in the range of about 25% to 45% by weight chlorine. CPE is commercially available from The DuPont Dow Elastomer Company such as Tyrin 3611P, Tyrin 2000 and Tyrin 3615P; all available from the DuPont Dow Elastomer Company. Tyrin is a trademark of the DuPont Dow Elastomer Company.

The amount of the CPE processing aids is generally from about 0.25 to about 5.0 parts by weight, and desirably from about 0.5 to about 4.0 parts by weight per 100 parts by weight of said CPVC.

Lubricants

Various lubricants are desired for use in the present invention to aid in processing and they generally include various oxidized polyolefins and/or paraffin waxes. More specifically, exemplary lubricants include polyglycerols of di- and trioleates, polyolefins such as polyethylene, polypropylene and oxidized polyolefins such as oxidized polyethylene and high molecular weight paraffin waxes. Since several lubricants can be combined in countless variations, the total amount of lubricant can vary from application to application. Preferably, an oxidized polyethylene is used. An example of an oxidized polyethylene is AC 629 sold by Allied Signal. In addition or in lieu of the oxidized polyethylene, preferably a paraffin wax is also included in the compounds of the instant invention. An example of a paraffin wax is SH 105 from De Gussa Chemicals. The total amount of the one or more lubricants is generally low such as less than about 5.0 parts by weight, desirably 0 or from about 0.1 to about 5.0 parts by weight, and preferably from about 0.4 to about 2.0 parts by weight per 100 parts by weight of the CPVC.

Additives

Various conventional additives which are known to the art and to the literature can also be utilized in generally conventional amounts provided that the additive does not alter the desirable physical properties and processability of the CPVC blend of the present invention. Such additives include antioxidants, other stabilizers, other impact modifiers, pigments, glass transition enhancing additives, other processing aids, fusion aids, fillers, fibrous reinforcing agents and antistatic agents.

In order to impart an aesthetic appearance or to improve U.V. resistance, various pigments or dyes can be utilized in a great number of combinations and amounts to achieve a desired end color of the product. Various pigments include $TiO_2$, carbon black, as well as various other colorants to yield various colors such as yellow, red, orange, etc. The use of pigments is optional and when utilized, the amount thereof is generally from about 0.1 to about 15 parts by weight per 100 parts by weight of CPVC. Additionally, various inorganic fillers can be utilized such as talc, clay, mica, wollastonite, silicas, and the like.

Processing

The CPVC compositions of the present invention are generally made by blending, mixing, etc., the various components in any conventional mixer such as a Banbury, or a Henschel mixer to form a physical mixture or blend such as a powder. The physical mixture of the composition components are then melt processed as by melt blending in an extruder. The extruder can have one screw or for the extrusion of pipe, multiple screws. Processing temperature of the CPVC composition is generally from about 180° C. to about 230° C. and desirably from about 195° C. to about 220° C.

As noted above, the CPVC compositions of the present invention have good impact strength properties especially at low temperature, and good UV resistance. The combination of the impact modifier of the present invention utilized with the above-noted zeolite resulted in unexpected high heat stability properties and permitted a reduced amount of metal containing stabilizers to be utilized, resulting in a melt processed article or product having a smooth surface. Thus, dynamic thermal stability values of at least 10, desirably at least 11, and preferably at least 12 or 13 minutes at 215° C. utilizing a 35 RPM rotor speed Brabender rheometer are readily achieved.

The CPVC compositions of the present invention are generally very suitable for piping and other extrudate forms and thus are generally utilized for portable water piping, hot water piping, radiant heat piping, industrial piping as for carrying various chemicals or other solutions, fire sprinkling lines, and the like.

The present invention will be better understood by reference to the following examples which serve to illustrate, but not to limit the present invention.

EXAMPLES

Compositions having proportions of components listed below in Table 1 and 3 were prepared to illustrate the desirable properties obtained by the melt processed compositions of the present invention. Each composition was prepared substantially as follows. The components of each composition were added in the stated amounts to a Henschel mixer and mixed at a temperature of about 99° C. until a substantially uniform mixture was obtained. Each composition was then transferred to an extruder and subsequently extruded at a temperature of about 200° C. The resulting extrudate was subjected to the various test procedures as set forth in Tables 2 and 3.

TABLE 1

| Ingredients | Control 1 | Control 2 | Example A |
|---|---|---|---|
| CPVC Resin (TempRite ® 674X571) (67.3% Cl; 0.92 I.V.) | 100 | 100 | 100 |
| Di-butyltin bis-thioglycolate (stabilizer) (Mark 292, Witco Chemical Co.) | 2.2 | 2.2 | 1.4 |
| Polyorganosiloxane acrylate copolymer impact modifier (Metablen S-2001, Mitsubishi Rayon Co.) | 4 | 6 | 7.6 |
| Zeolite (4A) (co-stabilizer) | 0 | 0 | 0.5 |
| Chlorinated Polyethylene (36% chlorine); Tyrin 3611P | 2 | 2 | 0.7 |
| Titanium Dioxide | 5 | 5 | 4 |
| Oxidized Polyethylene (lubricant) | 1.25 | 1.25 | 1.1 |
| Paraffin Wax (lubricant) | 0.75 | 0.75 | 0.4 |
| Total weight (grams) | 115.20 | 117.20 | 115.70 |

TABLE 2

| Test | Control 1 | Control 2 | Example A |
|---|---|---|---|
| Tensile (psi) (ASTM D638) | 7720 | 7150 | 7820 |
| Modulus (psi) (ASTM D638) | 359000 | 335000 | 370000 |
| Notched Izod, ¼" Izod bars (ft-lb/in) (ASTM D256) | 1.72 | 2.97 | 3.6 |
| Annealed HDT (° C.) (ASTM D648) | 110 | 110 | 110 |
| Appearance (visual) | Heavy Orange Peel | Heavy Orange Peel | Normal |
| Vice Crush - 60% (ASTM D2846) | 3/3 | 3/3 | 3/3 |
| Vice Crush - Full (ASTM D2846) | 2/3 | 3/3 | 3/3 |
| RT Staircase Impact (STD) (ASTM D2444) | 91.9 (91.6) | 120.8 (50.1) | 60.4 (40.6) |
| 0° F. 24 ft-lb Fixed Impact (ASTM D2444) | 0/10 | 6/10 | Not Tested |
| 32° F. Staircase Impact (STD) (ASTM D2444) | Not Tested | Not Tested | 24 (21.4) |

It is noted Example A of the present invention exhibits desired properties. Example A exhibits a higher tensile strength than the Control compounds and thus can beneficially withstand greater pressure during use, for example as a water pipe. Example A also exhibits a higher modulus and notched izod impact value. When a small amount of a zeolite co-stabilizer was utilized (Example B), an unexpected synergistic increase in dynamic thermal stability was obtained, see Table 3. Another important result was that a smooth or normal surface appearance was achieved utilizing a reduced amount of the metal stabilizer.

TABLE 3

(High Heat Stability Comparison)

| Ingredients | Control 3 | Example B |
|---|---|---|
| CPVC Resin (TempRite ® 674X571) (67.3% Cl; 0.92 I.V.) | 100 | 100 |
| Di-butyltin bis-thioglycolate (stabilizer) (Mark 292, Witco Chemical Co.) | 1.4 | 1.4 |
| Polyorganosiloxane acrylate copolymer impact modifier (Metablen S-2001, Mitsubishi Rayon Co.) | 7.6 | 7.6 |
| Zeolite (4A) (co-stabilizer) | 0 | 0.5 |
| Chlorinated Polyethylene (36% chlorine); Tyrin 3611P | .7 | 0.7 |
| Titanium Dioxide | 4 | 4 |
| Oxidized Polyethylene (lubricant) | 1.1 | 1.1 |
| Paraffin Wax (lubricant) | 0.4 | 0.4 |
| DTS Stability Time (min) | 10.2 | 14.0 |
| DTS Fusion Time (min) | 1.7 | 2.7 |
| DTS Torque (m-g) | 2900 | 2525 |
| DTS Temperature | 215 | 215 |

While in accordance with the Patent Statutes the best mode and preferred embodiment have been set forth, the scope of the invention is not limited thereto but rather by the scope of the attached claims.

What is claimed:

1. A melt processed article having improved surface smoothness, comprising:
   a composition derived from a chlorinated polyvinyl chloride (CPVC) having a chlorine content of from about 60% to about 75% by weight, wherein the polyvinyl chloride precursor has an inherent viscosity of from about 0.8 to about 1.2 per ASTM-D1243;
   from about 3 to about 12 parts by weight per 100 parts by weight of said CPVC of an impact modifier derived from an organosiloxane monomer and at least one acrylic monomer;
   from about 0.2 to about 2.5 parts by weight per 100 parts by weight of said CPVC of an aluminosilicate zeolite in particle form; wherein said zeolite particles have a mean particle diameter in the range of about 0.25 to about 1.5 microns and wherein said zeolite contains from 1% to 30% by weight water; and
   from about 1.0 to about 2.0 parts by weight per 100 parts by weight of said CPVC of a metal containing stabilizer.

2. A melt processed article according to claim 1, wherein said composition has a dynamic thermal stability of at least 11 minutes at 215° C.

3. An article according to claim 2, wherein said article is a water pipe.

4. An article according to claim 1, wherein said article is a water pipe.

5. A melt processed article according to claim 1, wherein said zeolite has the formula $M_{2/n}O:[Al_2O_3]_x:[SiO_2]_y:[H_2O]_z$, wherein M is a metal, n is the valence of said metal, and X, Y, and Z, independently, is from 1 to about 50, and wherein said metal containing stabilizer is a tin stabilizer, a lithium stabilizer, a sodium stabilizer, potassium stabilizer, magnesium stabilizer, calcium stabilizer, strontium stabilizer, barium stabilizer, zinc stabilizer, cadmium stabilizer, aluminum stabilizer, or antimony stabilizer, or combinations thereof.

6. A melt processed article according to claim 5, where said CPVC has a chlorine content of from about 65% to about 70% by weight, wherein said PVC precursor has an inherent viscosity of from about 0.85 to about 1.0;
   wherein said the amount of said impact modifier is from about 4 to about 10 parts by weight per 100 parts by weight of said CPVC, and
   wherein said impact modifier is a copolymer wherein said organosiloxane is a dialkyl siloxane wherein said alkyl group, independently, contains from 1 to about 5 carbon atoms, and wherein said acrylic monomer is an alkyl acrylate or an alkyl methacrylate monomer or both wherein, independently, each said alkyl group has from 1 to about 10 carbon atoms.

7. A melt processed article according to claim 6, wherein said composition has a dynamic thermal stability of at least 12 minutes at 215° C.

8. An article according to claim 6, wherein said article is a hot water pipe or a radiant heat pipe.

9. A melt processed article according to claim 6, wherein the amount of said zeolite is from about 0.4 to about 1.50 parts by weight per 100 parts by weight of said CPVC.

10. A melt processed article according to claim 9, wherein said impact modifier copolymer is derived from dimethyl siloxane, butyl acrylate, and methyl methacrylate,
    wherein said zeolite has the formula $Na_2O:[AL_2O_3]_{12}:[SiO_2]_{12}:[H_2O]_{27}$, and
    wherein said metal stabilizer is a dialkyltin bis(thioglycolate) wherein said alkyl group has from 1 to 10 carbon atoms.

11. A melt processed article according to claim 10, wherein said composition has a dynamic thermal stability of at least 13 minutes at 215° C.

12. An article according to claim 11, wherein said article is a hot water pipe or a radiant heat pipe.

13. An article according to claim 10, wherein said article is a hot water pipe or a radiant heat pipe.

* * * * *